United States Patent [19]
Wachs et al.

[11] Patent Number: 4,711,871
[45] Date of Patent: Dec. 8, 1987

[54] CATALYSTS COMPRISING RUTHENIUM ON TITANIA SURFACE MODIFIED WITH GROUP VA OXIDE OF VANADIUM, NIOBIUM OR TANTALUM

[75] Inventors: Israel E. Wachs, Bridgewater, N.J.; Darchun B. Yang, Houston, Tex.

[73] Assignee: Exxon Research and Engineering Company, Florham Park, N.J.

[21] Appl. No.: 808,008

[22] Filed: Dec. 11, 1985

Related U.S. Application Data

[63] Continuation-in-part of Ser. No. 626,457, Jun. 29, 1984, abandoned.

[51] Int. Cl.$^4$ .................. B01J 21/06; B01J 23/46; B01J 23/64
[52] U.S. Cl. .................................. 502/325; 518/715

[58] Field of Search .......................................... 502/325

[56] References Cited

U.S. PATENT DOCUMENTS

| 4,171,320 | 10/1979 | Vannice et al. | 502/325 X |
| 4,370,263 | 1/1983 | Visca | 502/325 |
| 4,477,595 | 10/1984 | Madon | 518/715 |

Primary Examiner—W. J. Shine
Attorney, Agent, or Firm—Richard E. Nanfeldt

[57] ABSTRACT

Catalyst compositions comprising ruthenium supported on a surface modified titania support wherein said support comprises a surface modifying oxide of vanadium, niobium, tantalum or mixture thereof, in a non-crystalline form, supported on said titania are useful for Fischer-Tropsch hydrocarbon synthesis reactions.

6 Claims, No Drawings

CATALYSTS COMPRISING RUTHENIUM ON TITANIA SURFACE MODIFIED WITH GROUP VA OXIDE OF VANADIUM, NIOBIUM OR TANTALUM

This application is a continuation-in-part of U.S. Pat. No. 626,457 filed on June 29, 1984, now abandoned.

BACKGROUND OF THE INVENTION

1. Field of the Invention

This invention relates to catalyst compositions of matter comprising ruthenium supported on a surface modified titania support. More particularly, this invention relates to new catalyst compositions, their preparation and use in Fischer-Tropsch hydrocarbon synthesis reactions, said catalyst compositions comprising ruthenium supported on a surface modified titania support, wherein said support comprises a surface modifying oxide of tantalum, vanadium, niobium or mixture thereof in non-crystalline form supported on the surface of said titania.

2. Background of the Disclosure

The use of catalysts comprising one or more catalytic metals supported on a titania or titania-containing support is known in the art. Thus, U.S. Pat. Nos. 4,042,625; 4,042,614 and 4,116,994 to Vannice and Garten disclose ruthenium, nickel and rhodium, respectively, supported on titania and titania-containing supports as Fischer-Tropsch catalysts for producing hydrocarbons from mixtures of CO and $H_2$. Ko and Garten in *Ethane Hydrogenolysis Studies of $TiO_2$-Supported Group VIII Metal Catalysts*, J. Catalysis, v. 68, p. 233-236 (1981) disclose each and every one of the Group VIII metals on both silica and titania supports as ethane hydrogenolysis catalysts. Vannice, in a 1982 article titled *Titania-Supported Metals as CO Hydrogenation Catalysts*, J. Catalysis v. 74, p. 119-202 (1982), discloses each one of the Group VIII metals, except osmium, supported on a titania support for Fischer-Tropsch synthesis of hydrocarbons. In this article, Vannice stated that rhodium and ruthenium on titania did not have as high a CO conversion activity as nickel on titania, but produced more useful hydrocarbons and less methane make than nickel on titania.

In a 1982 article by Wells et al. titled "Support Effects in the Ruthenium Catalyzed Hydrogenation of Carbon Monoxide", appearing on pages 247-254 of *Metal-Support and Metal-Additive Effects in Catalysis*, Imelik, et al (Ed.), Elsevier 1982, Wells et al also disclose ruthenium supported on titania as a Fischer-Tropsch catalyst. Another article on pages 337-348 of the same book by Reymond et al titled "Influence of the Support or of an Additive on the Catalytic Activity in the Hydrocondensation of Carbon Monoxide by Iron Catalysts" compares iron on various support materials as Fischer-Tropsch catalysts.

U.S. Pat. No. 4,171,320 discloses Fischer-Tropsch synthesis using a catalyst comprising ruthenium on a support comprising at least one refractory Group VA metal oxide. Suitable supports are disclosed in this patent as being vanadia, niobia, tantala, and mixtures of these oxides with other well known inorganic refractory oxides such as alumina, silica, etc. Similarly, U.S. Pat. No. 4,477,595 also discloses Fischer-Tropsch catalysts which may be ruthenium supported on various supports which may include physical mixtures of titania with vanadia, niobia, tantala and mixtures thereof. Still further, U.S. Pat. No. 4,149,998 to Tauster et al. discloses Group VIII metals, including ruthenium, on various supports including oxides of titanium, vanadium, niobium, tantalum and mixtures thereof and particularly zirconium titanate and barium titanate.

U.S. Pat. No. 4,149,998 to Tauster et al. relates to heterogeneous catalysts consisting of Group VIII metals, including ruthenium dispersed on oxide carriers selected from the group consisting of Ti, V, Nb, Ta and mixtures thereof and zirconium titanate and $BaTiO_3$. However, there is no suggestion in this patent that the catalytic metal be dispersed on a surface modified titania.

SUMMARY OF THE INVENTION

It has now been discovered that catalysts comprising ruthenium supported on a surface modified titania support wherein said support comprises a surface modifying oxide of tantalum, niobium, vanadium and mixture thereof supported on the surface of said titania, wherein said surface modifying oxide is in a non-crystalline form, are useful catalysts for Fischer-Tropsch hydrocarbon synthesis. Moreover, Fischer-Tropsch reactions conducted with these catalysts have been found to yield substantially alcohol free hydrocarbon products having high concentrations of internal olefins.

The catalysts of this invention are substantially different from catalysts comprising ruthenium supported on a support comprising a mixture of titania with one or more oxides of tantalum, niobium, vanadium, or mixture thereof.

DETAILED DESCRIPTION

The term surface modified titania as used herein refers to titania whose surface has been modified by an oxide niobium, vanadium, tantalum and mixture thereof in an amount such that the modified support exhibits properties different from (a) titania whose surface has not been modified, (b) different from bulk niobia, tantala, vanadia or mixture thereof and (c) different from mixtures of titania with one or more oxides of niobium, tantalum, vanadium or mixture thereof. Concomitantly, the final catalyst compositions of this invention exhibit properties different from ruthenium supported on (a) unmodified titania, (b) on bulk niobia, tantala, vanadia or mixture thereof and (c) on mixtures of (a) and (b).

Thus, the catalysts support useful for preparing the catalysts of this invention comprises titania whose surface has been modified with an oxide of a Group VA metal (vanadium, niobium, tantalum and mixture thereof). That is, the surface of the titania has been modified by an oxide of vanadium, niobium, tantalum or mixture thereof in an amount such that the catalyst exhibits properties different from titania whose surface has not been modified and different from bulk oxides of vanadium, niobium, tantalum and mixture thereof. Those skilled in the art know that the oxides of niobium, tantalum, vanadium and mixtures thereof are crystalline in their bulk form.

X-ray diffraction analysis of the catalyst supports useful for preparing the catalysts of this invention have revealed that the oxide or oxides of niobia, tantala, vanadia or mixture thereof are in a non-crystalline, amorphous form. Raman analysis has confirmed that the supported oxides of niobium, tantalum or vanadium are non-crystalline. Moreover, Raman analysis has revealed that the tantala and vanadia exist as surface species bound to the titania support. The Raman analysis did not positively reveal that the tantala was present as a surface species bound to the titania surface, but it is believed that this is because the titania signal overlaps the tantala signal.

In marked contrast, both X-ray and Raman analysis show that, for a physical mixture of titania and one or more oxides of niobium, vanadium, tantalum or mixture thereof, all of the oxides are present as distinct crystalline phases.

Thus, in the catalysts of this invention the ruthenium is supported on a non-crystalline oxide of niobium, tantalum, vanadium or mixture thereof which, in turn is supported on titania wherein the oxide of niobium, tantalum, vanadium or mixture thereof is believed to be in the form of a surface species bound to the titania support.

In the catalyts of this invention the ruthenium is supported on the surface modified titania. Consequently, the catalysts of this invention are prepared by a two-step sequential process wherein the surface modified titania support is prepared first, followed by depositing the ruthenium or ruthenium precursor on the support. In the first step, an oxide or precursor thereof of a metal selected from the group consisting of niobium, tantalum, vanadium or mixture thereof is deposited on the titania to form either the surface modified support or, in the case of one or more precursors of niobia, tantala, vanadia or mixture thereof, a support precursor. The support precursor will then be calcined to oxidize the modifying oxide precursor and form a support comprising titania whose surface has been modified by and supports an oxide of a metal selected from the group consisting of niobium, tantalum, vanadium or mixture thereof in a non-crystalline form.

The catalyst support precursors of this invention may be prepared by techniques well-known in the art, such as incipient wetness, impregnation, etc., the choice being left to the practitioner. When using the impregnation technique, the impregnating solution is contacted with the titania for a time sufficient to deposit the oxide precursor material onto the titania either by selective adsorption or alternatively, the excess solvent may be evaporated during drying leaving behind the precursor salt. If an impregnation or incipient wetness technique is used to prepare a support precursor of this invention, the transition metal oxide salt solution used may be aqueous or organic, the only requirement being that an adequate amount of precursor compound for the selected Group VA transition metal oxide or oxides be soluble in the solvent used in preparing this solution.

The support precursor composite will then normally be dried at temperatures ranging from about 50°–300° C. to remove the excess solvent and, if necessary, decompose the salt if it is an organic salt to form a catalyst precuror. The support precursor composite is then converted into the surface modified titania support by calcining at temperatures of from about 150° to 800° C. and preferably 300°–700° C. in a suitable oxidizing atmosphere such as air, oxygen, etc. The time required to calcine the composite will, of course, depend on the temperature and in general will range from about 0.5–16 hours. Reducing atmospheres may also be used to decompose the transition metal oxide precursors, but the resulting composite will then require subsequent calcination to convert the reduced metal component to the oxide form.

The supports of this invention will generally have metal oxide loadings of from about 0.5 to 25 wt.% metal oxide on the titania based on the total support composition, preferably from about 1 to 15 wt.%, more preferably from about 2–10 wt.% based on the total support composition.

The catalyst will be prepared by depositing a suitable ruthenium precursor component onto the surface modified titania support from a precursor solution using any of the well-known techniques such as incipient wetness, multiple impregnation, pore-filling, etc., the choice being left to the convenience of the practitioner. After impregnation, the impregnate is dried to remove the solvent and/or water therefrom. The dried composite will then be reduced in a hydrogen-containing gas stream beginning at a relatively low temperature of less than about 100° C., followed by slowly raising the temperature to between about 300°–400° C. for a time sufficient to reduce the ruthenium precursor on the surface modified titania support.

In general, the ruthenium metal loading on the surface modified titania support will range from about 0.05 to 10 weight percent metal, preferably from about 0.1–5 percent and still more preferably from about 0.2–2 weight percent of catalytic metal based on the total catalyst weight. These percentages refer to the catalytic metal in the reduced metal form.

When the catalysts of this invention are used for Fischer-Tropsch reactions, the reaction pressure will generally range from about 0 to 1000 psig and more preferably from about 50 to 500 psig. The $H_2$ to CO ratio will generally range from about 0.5/1 to about 4/1 at a space velocity broadly ranging from about 100–5,000 V/V/hr and preferably 300–2,000 V/V/hr. Reaction temperature will typically range between about 200°–300° C.

The invention will be more readily understood by reference to the examples below.

EXAMPLES

Catalyst Support Preparation

10% $Nb_2O_5/TiO_2$

A catalyst support consisting of 10% $Nb_2O_5$ supported on $TiO_2$ was prepared according to the following procedure. Degussa P-25 $TiO_2$ having a BET surface area of 50 $M^2/g$ containing 65% anatase and 35% rutile titania was used to support the niobia. To 10 g of $TiO_2$ was added 100 cc of ethanol to form a slurry. To this slurry was added 2.5 g of $Nb(C_2H_5O)_5$ (Alfa) and the mixture stirred overnight in a nitrogen atmosphere. After this, the mixture was placed in a hood in the presence of air to evaporate the alcohol and decompose the ethoxide ligand. Three cc of water was then added and the slurry stirred overnight at a temperature of about 40° C. to ensure that the ligand was decomposed. The resulting solids were placed in a quartz boat, slowly heated to 400° C. in a 1:1 mixture of $O_2/He$, and then calcined in $O_2$ for 2 hours at 575° C. to form a calcined support.

The calcined support was determined by calculation (based on the niobium ethoxide and the weight of titania) to contain 10% $Nb_2O_5$ on $TiO_2$ with the niobium content expressed as niobium pentoxide, $Nb_2O_5$. X-ray diffraction analysis (Philips diffractometer using CuK radiation and diffracted beam monochromator) did not reveal the presence of any crystalline niobia. Raman analysis showed that the niobia was a non-crystalline, surface niobia species bound to the $TiO_2$ support surface.

Catalyst Support Preparation

10% $Ta_2O_5/TiO_2$

The tantalum oxide was supported on $TiO_2$ obtained from Degussa (P-25). The $TiO_2$ support had a BET surface area of 50 m²/g. The $Ta_2O_5/TiO_2$ catalyst was prepared in a glove box under nitrogen atmosphere to prevent the decomposition of the tantala precursor $Ta(OC_2H_5)_5$. The $Ta(OC_2H_5)_5$ was obtained form Alfa. 10 gms of $TiO_2$ were added to 100 cc of ethanol, and 1.84 gms of $Ta(OC_2H_5)_5$ were subsequently added to this mixture. The mixture was stirred overnight in the nitrogen environment to allow the ethanol solvent to evaporate. The mixture was taken out of the glove box and 3 cc of water was added, and further allowed to stir at 40° C. overnight in the hood. The resultant powder was placed in a quartz boat and slowly heated in a 1:1 mixture of $O_2$ in He up to 400° C., and then in 100% $O_2$ from 400° to 575° C. The sample was calcined at 575° C. for 2 hours. The finished support possessed 10% $Ta_2O_5/TiO_2$ with the tantala content expressed as tantalum pentoxide. X-ray diffraction analysis (Philips diffractometer using CuKα radiation and a diffracted beam monochromator) did not reveal any crystalline $Ta_2O_5$ phases, and confirmed the amorphous nature of tantalum oxide supported on $TiO_2$. Raman analysis confirmed that the supported tantalum oxide was non-crystalline.

1% $Ta_2O_5/TiO_2$

This catalyst support was prepared in the same manner as the 10 wt% of tantala on titania except that 0.18 grams of $Ta(OC_2H_5)_5$ were added to 10 grams of the $TiO_2$ to yield a support of 1 wt% tantala on titania.

2% $V_2O_5/TiO_2$

A catalyst support consisting of 2% $V_2O_5$ supported on $TiO_2$ was prepared according to the following procedure. Degussa P-25 $TiO_2$ having a BET surface area of 50 M²/g containing 65% anatase and 35% rutile titania was used to support the vanadium oxide. To 10.0 g of $TiO_2$ was added a solution prepared by dissolving 0.20 g of $V_2O_5$ into 150 cc of water which contained 2.52 g of formamide and 1.13 g of oxalic acid. Raman and infrared analysis showed that under these conditions the $V_2O_5$ is converted to vanadyl oxalate. The mixture was stirred at about 65° C. until the water was evaporated. The resulting solids were then dried in vacuum overnight at 110° C. and the resulting powder calcined in air for two hours at 575° C., cooled and crushed to 120 mesh (Tyler) particles.

The calcined support was determined by calculation (based on the weight of vanadia and titania) to contain 2% $V_2O_5$ on $TiO_2$ with the vanadium content expressed as vanadium pentoxide. X-ray diffraction analysis (Philips diffractometer using CuK radiation and a diffracted beam monochromator) did not reveal the presence of any crystalline vanadia and confirmed the amophous nature of the vanadia supported on the titania. Raman analysis showed that the $V_2O_5$ was a non-crystalline, surface vanadia species bound to the $TiO_2$ support surface.

10% $Ta_2O_5/TiO_2$ (physical mixture)

A physical mixture of crystalline $Ta_2O_5$ (Alfa) and $TiO_2$ (Degussa P-25) was prepared. The $Ta_2O_5$ had a BET surface area of 4 m²/gm; and the $TiO_2$ had a BET surface area of 50 m²/g. The two oxides were added to 150 cc of water and stirred at 65° C. overnight to evaporate the water. The $Ta_2O_5/TiO_2$ mixture was calcined in air at 575° C. for 4½ hours. X-ray diffraction analysis revealed that the $Ta_2O_5$ in the calcined support material was 100% crystalline. This support was not a support within the scope of this invention.

Catalyst Preparation

Ruthenium impregnation and reduction

The surface modified $TiO_2$ supports as well as the physical mixture of tantala and titania were impregnated with $Ru(NO)(NO_3)_3$ in acetone to yield 1 wt.% ruthenium metal loading based on the total catalyst composition. The mixtures of support material and ruthenium solution were shaken and the acetone was allowed to evaporate at room temperature. The ruthenium salt on the supports was decomposed to Ru metal in a 20% $H_2$/He stream in a Lindberg furnace at 450° C. for 4 hours. The samples were then cooled to room temperature in the 20% $H_2$/He stream, and purged for 20 minutes at room temperatue in flowing helium. The so-formed catalysts were then exposed to ambient air and sealed in a bottle.

Fixed Bed Reactor Unit

The reactor was made of ¼"O.D. 316 stainless steel tube, and catalyst amounts of 1 to 3 ml were typically used.

A commercially prepared mixture of $H_2$ and CO, containing 1% nitrogen as internal standard, was passed through a 4 Å molecular sieve trap to eliminate water vapor or impurities, and then through a Deoxo unit to remove traces of oxygen. The feed gas was then passed through a mass flow meter (Matheson Model 8160-0452) which is used to monitor the gas flow into the reactor. The exit stream from the reactor was passed through a heated one-pot collector that collected the heavy liquid products. The light products were not trapped in the one-pot collector.

A slip stream of the residual gases flowed through a sample loop of a Carle Model 156 gas chromatograph, and then recombined with the original flow stream which was sent to a saturator and then to a wet test meter used to monitor the total output of gases. The exit gas flow rate was also measured at the exit line of the wet test meter with a soap bubble meter. The sampling of gaseous products was performed automatically with a Perkin-Elmer Sigma 115 data station. The reactor was heated with a fluidized sand bath.

The condensed liquid products were analyzed using a Perkin-Elmer Sigma I dual column glass chromatograph with a 60 meter SP-2100 coated glass capillary column or a 12 meter supported 10% SP-2100 packed column. When the products contained some solid material, both the sample and syringe were heated to about 80° C. before the sample was withddrawn and injected into the injection port which was held at 330° C. The oven temperature was programmed at 10° C./min. from 54° C. to a final temperature of 330° C.

The detailed product composition for straight chain, branched chain, and olefinic product content were analyzed by $^{13}C$ NMR.

Catalyst Pretreatment

In order to obtain active catalysts with good stability, the catalysts were pretreated. The reactor was filled with 1-3 ml of catalyst. After being assembled on the unit, the catalyst was flushed and then pressure-tested with argon. The pressure was reduced to atmospheric pressure and the temperature of the catalyst then raised to 400° C. (725° F.) while pure hydrogen flowed through the reactor at a space velocity (SV) of 300 V/V/H. The catalyst was held at this temperature for four hours, and then cooled to 200° C., still under hydrogen. Next, the catalyst in the reactor was treated, at atmospheric pressure, with premixed $H_2$ and CO($H_2$/CO equals 2) at a space velocity of 300 V/V/H and a temperature of 200° C. for 16 to 24 hours. The catalyst tempereature was then brought down to 160° C. with a continuous flow of $H_2$/CO. The reactor was then pressurized with argon to the desired pressure, and the reactor isolated. Following this, the system was pressurized to the desired range with $H_2$/CO through the bypass line and the desired flow rate was set through the fine metering valve. The reactor was then slowly exposed to $H_2$/CO. Before the start of the experiment, the liquid produced during the pretreatment was drained off. The reactor was heated very slowly while continuously monitoring the gas contraction and catalyst bed temperatures. These precautionary steps are to prevent the catalyst temperature from running away. The heating rate was about 10° C./hr. Whenever a sudden increase in gas contraction or temperature occured, the heating rate was slowed. After the desired temperature was reached, the reaction conditions were maintained overnight. The liquid products were collected for analysis before each change in experimental parameters.

Results

The results of the various runs are shown in Tables I and II. Table I clearly shows the difference between the catalysts of this invention and the prior art ruthenium on titania catalysts. Table II shows that the catalysts of this invention are markedly different from catalysts employing a physical mixture of titania and Group VA metal oxide.

TABLE I

|  | 1% Ru/TiO$_2$ | 1% Ru/10% Nb$_2$O$_5$/TiO$_2$ | 1% Ru/10% Ta$_2$O$_5$/TiO$_2$ | 1% Ru/2% V$_2$O$_5$/TiO$_2$ |
|---|---|---|---|---|
| Temp. (°C.) | 238 | 230 | 235 | 252 |
| H$_2$ + CO converted | 37.0 | 43.0 | 19.5 | 71.3 |
| CO$_2$ | 3.8 | 1.9 | 3.7 | 3.5 |
| CH$_4$ | 14.5 | 10.9 | 10.9 | 12.5 |
| C$_2$ | 8.3 | 6.6 | 14.8 | 3.3 |
| C$_3$ + C$_4$ | 23.0 | 17.3 | 13.8 | 10.0 |
| C$_5$+ | 50.4 | 63.3 | 56.8 | 70.7 |
| Hydrocarbon Liquid Products |  |  |  |  |
| wt. % alcohols: | 5.1 | 0 | 0 | 3.8 |
| wt. % olefins: |  |  |  |  |
| terminal | 14.5 | 4.5 | 0 | 6.9 |
| internal | 24.6 | 63.2 | 6.32 | 8.7 |
| int./term. | 1.7 | 14 | — | 4.2 |
| wt. % aliphatic: |  |  |  |  |
| linear | 46.6 | 26.3 | 79.6 | 46.5 |
| branched | 9.2 | 6.0 | 14.1 | 14.1 |
| branch./lin. | 0.20 | 0.23 | 0.18 | 0.30 |
| Reaction Conditions: |  |  |  |  |
| 60 psig |  |  |  |  |
| 300 v/v/hr |  |  |  |  |
| H$_2$/CO = 2 |  |  |  |  |

TABLE II

|  | 1% Ru/10% Ta$_2$O$_5$/TiO$_2$ | 1% Ru/1% Ta$_2$O$_5$/TiO$_2$ | 1% Ru/10% Ta$_2$O$_5$ + TiO$_2$ (physical mixture) |
|---|---|---|---|
| Temp. (°C.) | 235 | 232 | 240 |
| H$_2$ + CO converted | 19.5 | 31.5 | 47.4 |
| CO$_2$ | 3.7 | 3.2 | 5.0 |
| CH$_4$ | 10.9 | 15.3 | 8.4 |
| C$_2$ | 14.8 | 4.2 | 4.2 |
| C$_3$ + C$_4$ | 13.8 | 24.0 | 16.9 |
| C$_5$+ | 56.8 | 53.3 | 65.5 |
| Hydrocarbon Liquid Products |  |  |  |
| wt. % alcohols: | 0 | 1.4 | 3.0 |
| Wt. % olefins: |  |  |  |
| terminal | 0 | 13.9 | 10.0 |
| internal | 6.3 | 30.3 | 36.4 |
| int./term. | — | 2.2 | 3.6 |
| wt. % aliphatic: |  |  |  |
| linear | 79.6 | 46.2 | 48.0 |
| branched | 14.1 | 8.2 | 2.6 |
| branch./lin. | 0.18 | 0.18 | 0.05 |

Reaction Conditions same as per Table I.
*The tantalum pentoxide was 100% crystalline

What is claimed is:

1. A process for preparing a catalyst comprising ruthenium supported on a surface-modified titania support wherein said support comprises an oxide of a metal selected from the group consisting of niobium, vanadium, tantalum or mixture thereof, in a non-crystalline form, supported on said titania wherein said process comprises the sequential steps of:

(a) forming said support comprising titania whose surface has been modified with and supports an oxide of a metal selected from the group consisting of niobium, tantalum, vanadium or mixture thereof wherein said supported, modifying oxide is a non-crystalline form;

(b) impregnating said so-formed surface modified titania support with a solution of a ruthenium precursor compound; and, (c) converting said ruthenium precursor compound to ruthenium to form said catalyst.

2. The process of claim 1 wherein the amount of said supported oxide of niobium, vanadium, tantalum or mixture thereof present on said catalyst ranges from about 0.5 to 25 wt.% of the total support composition.

3. The process of claim 2 wherein the amount of supported ruthenium present in said catalyst ranges from about 0.05 to 10 wt.% of the total catalyst composition.

4. The process of claim 1 wherein said support is prepared by depositing a precursor of a solution of an oxide of niobium, vanadium, tantalum or mixture thereof on the surface of said titania to form a precursor/titania composite, followed by calcining the so-formed composite to convert said precursor to the oxide to form said support.

5. The process of claim 4 wherein the amount of said supported oxide of niobium, vanadium, tantalum or mixture thereof present on said catalyst ranges from about 0.5 to 25 wt.% of the total support composition.

6. The process of claim 5 wherein the amount of supported ruthenium present on said catalyst ranges from about 0.05 to 10 wt.% of the catalyst composition.

* * * * *